(12) United States Patent
Gottschlich et al.

(10) Patent No.: US 9,317,297 B2
(45) Date of Patent: Apr. 19, 2016

(54) REPLAY EXECUTION OF INSTRUCTIONS IN THREAD CHUNKS IN THE CHUNK ORDER RECORDED DURING PREVIOUS EXECUTION

(71) Applicant: Intel Corporation, Santa Clara, CA (US)

(72) Inventors: Justin E. Gottschlich, Santa Clara, CA (US); Klaus Danne, Braunschweig (DE); Cristiano L. Pereira, Sunnyvale, CA (US); Gilles A. Pokam, Fremont, CA (US); Rolf Kassa, Braunschweig (DE); Shiliang Hu, Los Altos, CA (US); Tim Kranich, Braunschweig (DE)

(73) Assignee: Intel Corporation, Santa Clara, CA (US)

(*) Notice: Subject to any disclaimer, the term of this patent is extended or adjusted under 35 U.S.C. 154(b) by 805 days.

(21) Appl. No.: 13/629,131

(22) Filed: Sep. 27, 2012

(65) Prior Publication Data

US 2014/0089642 A1 Mar. 27, 2014

(51) Int. Cl.
*G06F 9/44* (2006.01)
*G06F 9/38* (2006.01)
*G06F 9/455* (2006.01)
*G06F 11/30* (2006.01)
*G06F 11/36* (2006.01)
(Continued)

(52) U.S. Cl.
CPC .............. *G06F 9/44* (2013.01); *G06F 9/3851* (2013.01); *G06F 9/455* (2013.01); *G06F 11/30* (2013.01); *G06F 11/3476* (2013.01); *G06F 11/36* (2013.01); *G06F 9/52* (2013.01); *G06F 11/3414* (2013.01); *G06F 2201/815* (2013.01); *G06F 2201/825* (2013.01); *G06F 2201/865* (2013.01)

(58) Field of Classification Search
None
See application file for complete search history.

(56) References Cited

U.S. PATENT DOCUMENTS

2010/0251031 A1 9/2010 Nieh et al.
2011/0264959 A1 10/2011 Subhraveti
(Continued)

FOREIGN PATENT DOCUMENTS

WO WO 2014/052637 A1 4/2014

OTHER PUBLICATIONS

International Search Report and Written Opinion in International Application No. PCT/US2013/061990, mailed Jan. 29, 2014, 8 pages.
(Continued)

*Primary Examiner* — Kenneth Kim
(74) *Attorney, Agent, or Firm* — Patent Capital Group

(57) ABSTRACT

Embodiments may provide a method for performing a replay of a previous execution of a program. The method includes generating an order of recorded chunks of instructions across a plurality of recorded threads based, at least in part, on log files generated from the previous execution of the program. The method includes initiating execution of the program, the executing program having a plurality of threads, each thread having a number of chunks of instructions. The method includes intercepting, by a virtual machine unit executing on a processor, an instruction of a chunk before the instruction is executed. The method includes determining, by a replay module executing on the processor, that the chunk is an active chunk if the chunk is currently in line for execution according to the order of recorded chunks, and responsive to a determination that the chunk is the active chunk, executing the instruction.

15 Claims, 7 Drawing Sheets

(51) Int. Cl.
*G06F 11/34* (2006.01)
*G06F 9/52* (2006.01)

(56) References Cited

U.S. PATENT DOCUMENTS

2012/0011491 A1   1/2012   Eldar
2012/0239987 A1   9/2012   Chow et al.

OTHER PUBLICATIONS

International Patent Application No. PCT/US2012/031735 filed Mar. 30, 2012 entitled, "Tracing Mechanism for Recording Shared Memory Interleavings on Multi-Core Processors"; 31 pages.

Pokam, Gilles et al. "Core Racer: A Practical Memory Race Recorder for Multicore x86 TSO Processors", MICRO'11, Dec. 3-7, 2011, Copyright 2011; 10 pages.

International Preliminary Report on Patentability in International Application No. PCT/US2013/061990, mailed Apr. 9, 2015, 7 pages.

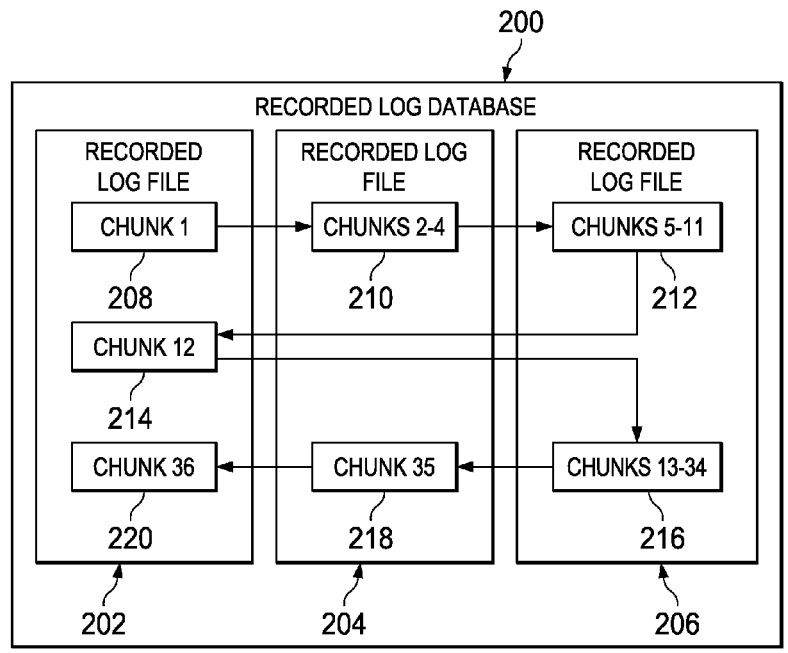
FIG. 2
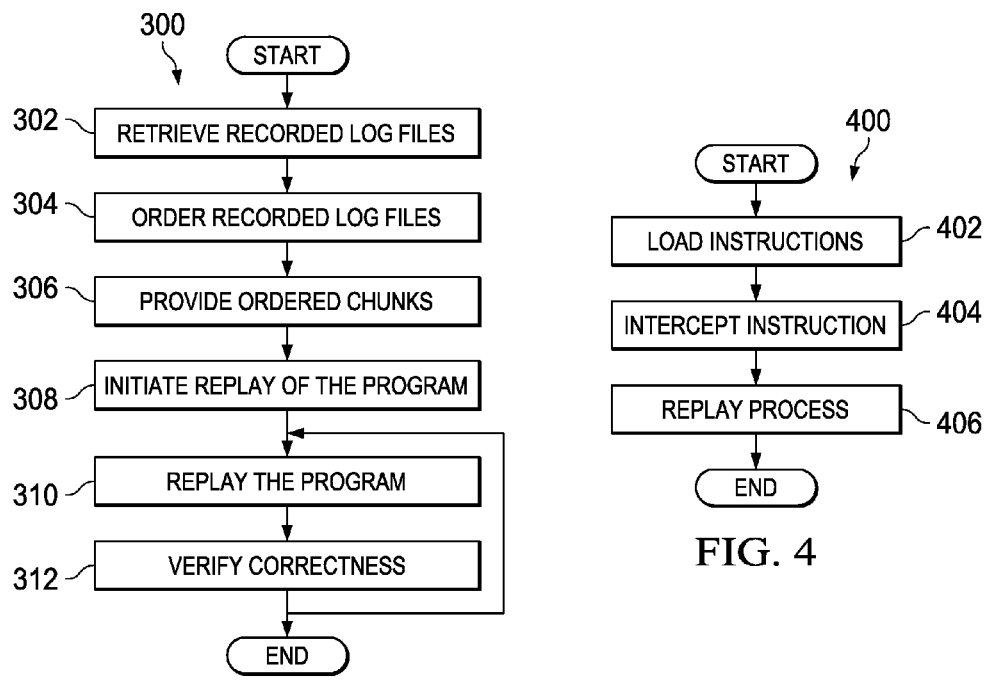
FIG. 3
FIG. 4

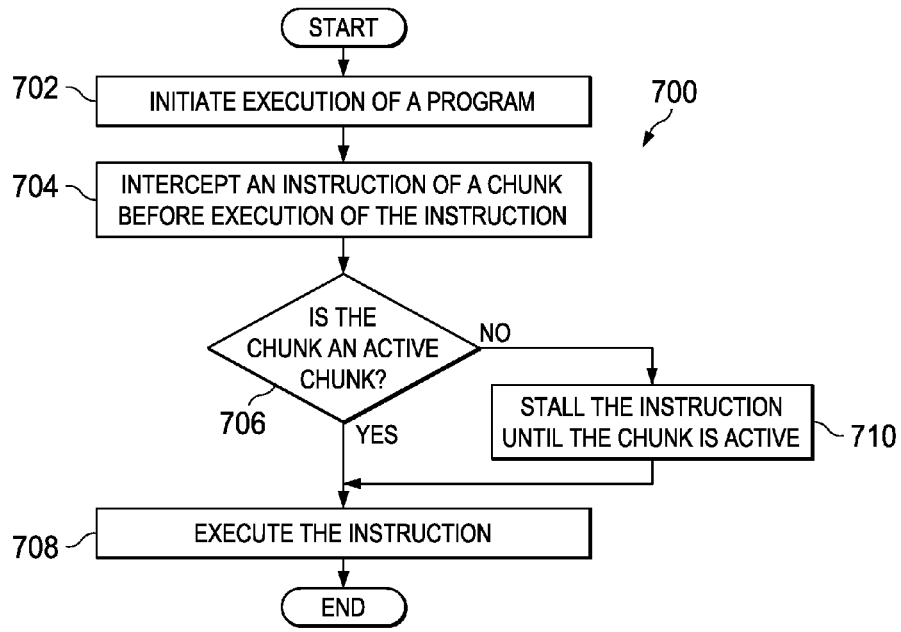
FIG. 7
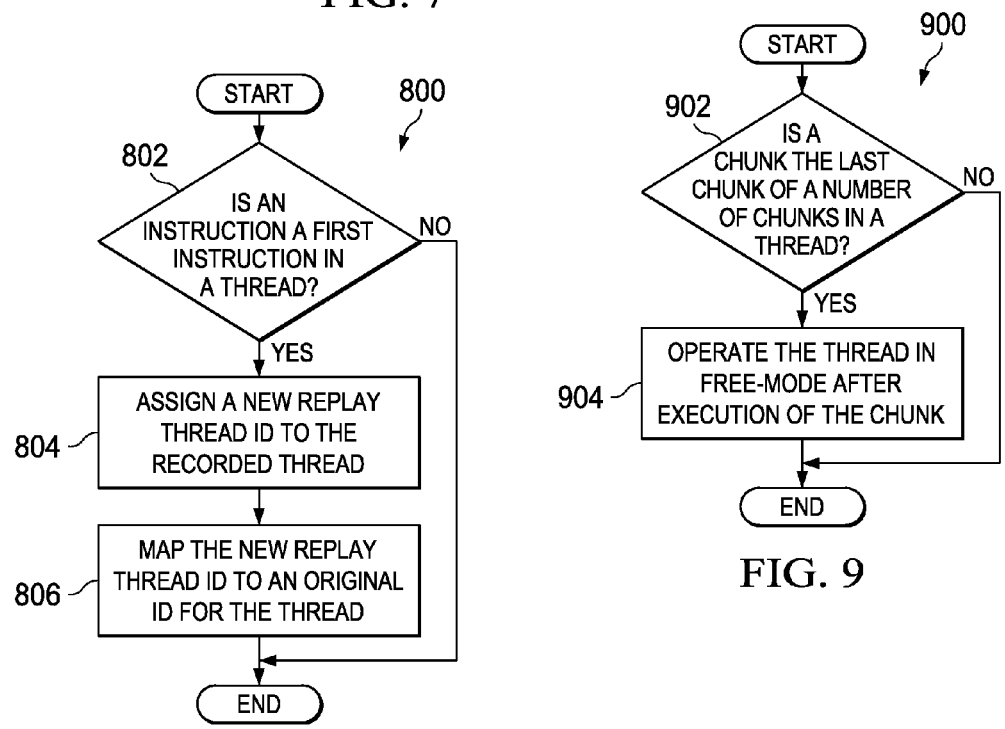
FIG. 8
FIG. 9

REPLAY EXECUTION OF INSTRUCTIONS IN THREAD CHUNKS IN THE CHUNK ORDER RECORDED DURING PREVIOUS EXECUTION

TECHNICAL FIELD

This disclosure relates in general to the field of replay executions and, more particularly, to replaying a recorded execution by a chunk-based memory race recorder.

BACKGROUND

Multi-core processors can be found in many computing devices today, including servers, desktops, laptops, mobile devices, and systems-on-chips. The move to these multi-core processor systems has allowed the development of parallel programs to take advantage of the enhanced performance. As parallel programs become pervasive in software development environments, an increasing level of attention is focused on the lack of debugging tools for such programs.

Parallel programs, running in a multi-core processor system and sharing memory, can result in non-deterministic executions if not properly synchronized. This non-determinism may arise in different situations, including the many ways in which the different threads of execution interleave in shared memory, making the reproduction and the understanding of a program execution difficult. Such non-deterministic executions can lead to concurrency violations that tend to occur more frequently with an increasing number of shared memory accesses, an increasing number of software threads, and a growing program complexity.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 2 is an example illustration of a recorded log database in accordance with an embodiment;

FIG. 3 is a simplified flowchart illustrating a method for memory race recorder replaying in accordance with an embodiment;

FIG. 4 is a simplified flowchart illustrating a method for replaying a program in accordance with an embodiment;

FIG. 7 is a simplified flowchart illustrating a process for replaying an instruction in accordance with an embodiment;

FIG. 8 is a simplified flowchart illustrating a process for mapping thread identifications in accordance with an embodiment;

FIG. 9 is a simplified flowchart illustrating a process for operating free-mode in accordance with an embodiment;

DETAILED DESCRIPTION OF EXAMPLE EMBODIMENTS

Example Embodiments

Figure 1:
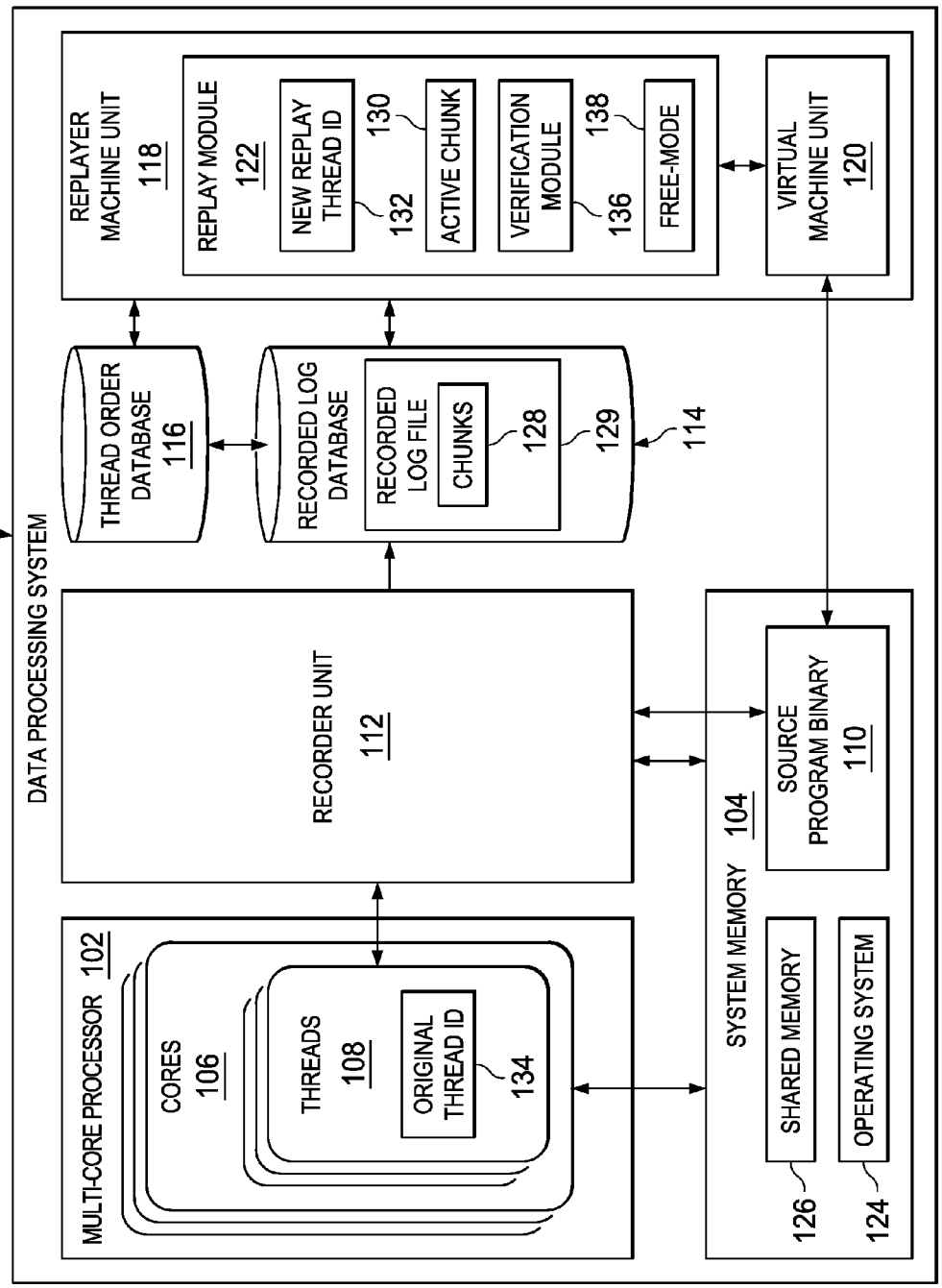
FIG. 1 is an example illustration of a data processing system in accordance with an embodiment.

FIG. 1 is an example illustration of a data processing system 100 in accordance with an embodiment. Data processing system 100 includes a multi-core processor 102 coupled to a system memory 104. Multi-core processor 102 may include cores 106, which may execute threads 108. A "thread" may also be referred to as a "process." A source program binary 110, or "program," may be an application or program that is being executed in data processing system 100. A recorder unit 112 may trace the signals between multi-core processor 102 and system memory 104 when executing source program binary 110. Recorder unit 112 may store these recordings in recorded log database 114 and thread order database 116. A replayer machine unit 118 may access databases 114 and 116 to replay an execution of source program binary 110. Replayer machine unit 118 may include a virtual machine unit 120 and replay module 122.

Multi-core processor 102 serves to execute instructions for software that may be loaded into system memory 104. Multi-core processor 102 may be a number of processors, a single processor capable of executing multiple processes, or some other type of processor, depending on the particular implementation. A number, as used herein with reference to an item, means one or more items. Further, multi-core processor 102 may be implemented using a number of heterogeneous processor systems in which a main processor is present with secondary processors on a single chip. As another illustrative example, multi-core processor 102 may be a symmetric multi-processor system containing multiple processors of the same type.

Processors for a variety of applications are available with multiple thread capability with a single processing core or with multiple processing cores. Each thread or core is able to operate on one set of instructions while another thread or core independently operates on a different set of instructions. Multi-core processor 102 may be deployed in multiple processor architectures, so that, for example two dual core processors present four independent processing cores.

System memory 104 is an example of a storage device. A storage device is any piece of hardware that is capable of storing information such as, for example and without limitation, data, program code in functional form, and/or other suitable information either on a temporary basis and/or a permanent basis. Storage devices may also be referred to as computer readable storage devices in these examples. System memory 104 could include, for example, a random access memory (RAM) or any other suitable volatile or non-volatile storage device. System memory 104 could also include persistent storage, which may take various forms, depending on the particular implementation.

System memory 104 may include an operating system 124 and different memory locations. One or more of these memory locations may be a shared memory 126. Shared memory 126 may be accessed by more than one core of multi-core processor 102. System memory 104 may include source program binary 110. Source program binary 110 may include a sequence of one or more instructions in a program to be executed by multi-core processor 102.

Recorder unit 112 may be an example of a memory race recorder (MRR). Recorder unit 112 may be used to record which instructions each core of cores 106 performs. In one example, the instructions to be performed by cores 106 are divided into threads 108. Each core will execute all of a single thread, and then move on to another thread. In an embodiment of this disclosure, recorder unit 112 records the interleavings of shared memory 126 accesses on multi-core processor architectures.

Memory locations of system memory 104 accessed by load or store operations can be tracked using hardware mechanisms such as transactional memory, hardware lock elision, or signatures. One mechanism uses two bloom filters per core to monitor the load and store addresses, respectively. Each time a load or store operation commits, a counter (one per core) is incremented and the corresponding accessed memory address is inserted into the appropriate bloom filter. The read set (RS) is the set of monitored load addresses and the write set (WS) is the set of monitored store addresses. The counter describes the current region of execution in terms of number of accessed memory addresses, which is referred to as a chunk.

Recorder unit 112 may store the recordings in recorded log database 114. The recorder unit 112 records chunks 128 as they are executed by threads 108 and stores the records a recorded log file 128 in recorded log database 114. Each thread of threads 108 may execute multiple chunks. For each thread, a different recorded log file 129 may be stored in recorded log database 114. Recorded log file 129 may include chunks 128 for that specific thread. Recorder unit 112 may also record the ordering between threads 108 and store the order sequentially in thread order database 116. Each chunk includes the number of instructions executed by source program binary 110 for that chunk. Also, threads 108 may be mapped by replay module 122.

In a shared memory multi-core processors system, the coherence protocol maintains memory coherence across cores by issuing coherence requests for shared memory accesses. On receiving a coherence request, hardware checks the RS and the WS with the inbound address. A conflict is detected: when the inbound address is a read and a match is found with an address in the WS; or when the inbound address is a write and a match is found with an address in the RS or the WS. A detection of a conflict terminates the current chunk. On terminating a chunk, recorder unit 112 logs a trace entry that includes the size of the chunk, i.e. the value of the counter, and a global timestamp. The global timestamp is used to provide a total order across all logged chunks 128. On new generations of multi-core processor architectures, the invariant timestamp (TSC) can serve as global timestamp. After a chunk termination, the RS and the WS are cleared and the counter is reset.

A major difficulty with logging the interleaving of shared memory accesses under Total Store Order (TSO) is that loads can be reordered before prior stores. This reordering can lead to incorrect ordering of chunks. The resulting chunk execution order, which follows increasing timestamp order, does not match the commit order. Embodiments address this issue without changes to the cache coherence protocol or to the cache subsystem.

Embodiments provide that given a chunk ordering obtained from a TSO execution, the outcome of re-executing these chunks is consistent with the original program execution. When a store is ordered to memory in the same chunk as the one in which its subsequent loads commit, there are no potential ordering violations. The lack of potential ordering violations stems from the loads and the store being executed atomically in the same chunk.

When a store commits to memory in a different chunk than the one from which the chunk has retired and there exists a later load that commits in an earlier chunk, than there is a chance that an ordering violation may occur. In the global ordering of chunks from different processors (ordered by timestamp), prior ordering systems can create a conflicting remote chunk interleaved between the chunk in which the later load commits and the chunk in which the prior store commits. In this case, the chunk in which the load commits may be referred to as the problematic chunk (P-chunk). When a P-chunk terminates, the number of prior retired stores still awaiting commit in the store buffer (STB) are recorded. Because these stores are pending commit at the time the P-chunk terminates, these stores can only be ordered to memory in a chunk which has a higher timestamp than the P-chunk in which the loads commit. The number of such stores is obtained by calculating the size of the reordered store window (RSW), which is defined to be exactly how many stores subsequent loads passed.

Replayer machine unit 118 may replay the recorded execution of source program binary 110. Replayer machine unit 118 utilizes virtual machine unit 120 to intercept instructions from source program binary 110 before they are executed. Replay module 122 may manage the execution of each instruction. Replay module 122 may access chunks 128 in recorded log database 114 and execute instructions in order of chunks 128. As mentioned above, chunks 128 may have been time stamped and ordered according to their timestamps. The chunk that is currently executing in replay module 122 is an active chunk 130.

Replay module 122 may also access thread order database 116. For each new thread that replay module 122 identifies, a new replay thread ID 132 is created for that thread. New replay thread ID 132 may be mapped to an original thread ID 134 so that replay module 122 may identify which chunks belong to which threads.

Replay module 122 may also include verification module 136. Verification module may dynamically check for correctness that the replayed program execution matches the recorded execution. Verification module 136 may check for correctness by determining a chunk is incomplete when it does not replay completely and then stalling the replay at the incomplete chunk, comparing instruction pointers of the replayed program against the instruction pointers of the recorded program during an interrupt, checking that a total number of replayed instructions matches a total number of recorded instructions at program termination, and/or checking that a final memory state of the replayed program matches a final memory state of the recorded program at the end of execution.

The illustration of data processing system 100 in FIG. 1 is not meant to imply physical or architectural limitations to the manner in which different illustrative embodiments may be implemented. Other components in addition to, and/or in place of, the ones illustrated may be used. Some components may be unnecessary in some illustrative embodiments. Also, the blocks are presented to illustrate some functional components. One or more of these blocks may be combined and/or divided into different blocks when implemented in different illustrative embodiments. For example, operating system 124 may be located in a separate memory or storage device. Additionally, source program binary 110 may be located in other locations as well.

In operational terms, and specifically, in an embodiment, recorded log file 129 contains the recorded chunks for a thread. Recorded log file 129 is used to capture the order in which shared-memory interleavings occurred between threads in the recorded execution of the source program binary.

One or more embodiments of this disclosure provide a virtual machine unit that can allow or disallow the forward progress of individual threads of the replayed execution of the recorded program.

One or more embodiments of this disclosure provide algorithms that are sufficient to analyze the recorded log files and use the results to order the replayed program such that its execution is identical to the execution of the recorded program.

One or more embodiments of this disclosure provide correctness checks that dynamically ensure the replayed execution precisely matches the recorded execution in one or more of the following ways.

In a first example correctness check in an embodiment, every chunk in the recorded program is replayed in the identical order in which it was recorded. Once the number of instructions executed in the replayed program exceeds the current chunk, the execution of the replay moves to the next chunk, which is time stamped and ordered. If a chunk does not replay completely, the execution stalls at the incomplete chunk allowing a developer to investigate the root cause and identify which chunk has not completed its execution.

In another correctness check in an embodiment, upon termination of a chunk by interrupt operations, an instruction pointer (IP) of the replayed program may be compared against an IP of the recorded program. These IP comparisons may have to be identical for the replayed program to be correct. If the IPs do not match, the verification module logs an IP mismatch error and continues execution.

In yet another correctness check in an embodiment, the total number of replayed instructions may have to match the total number of recorded instructions after discarding any differences that are part of differing environments (e.g., environment variables). The verification module may perform a check on these instructions at program termination for each thread and the total instructions executed for the entire program. If a deviation for any thread is found, an error may be logged.

In yet another correctness check in an embodiment, the final memory state of the replayed program may be checked at the end of execution to ensure it matches the final memory state of the recorded program. If the order of shared memory accesses replayed is not the same as the recorded order, the final memory state is different. Verification module 136 may perform a memory snapshot comparison against the original program when the replayed program terminates. If the memory states differ, an error may be logged.

One or more embodiments of this disclosure provide optimizations to the algorithms discussed above to improve the practicality of the replay module.

Additionally, in an embodiment, replay module 122 includes free-mode 138. One or more embodiments provide that when a thread completes execution of its final chunk, the thread is allowed to execute in a free-mode 138. Free-mode 138 allows threads to execute without any ordering constraints between other executing threads. Free-mode 138 may also be enabled or disabled directly through an application programming interface (API) of the replay module so that tools that are built on top of the replay module, such as a data race detection tool, can use free-mode 138 as needed.

One or more embodiments of this disclosure provide that free-mode 138 may be useful for generalized recorder units because threads might otherwise be infinitely stalled if their execution is not complete at the point where their last chunk ends. For example, consider a scenario where a thread has "N" instructions left in its total execution, none of which cause chunk terminations, and therefore, are not represented by additional chunks by the recorder logs files. If free-mode 138 is not supported by the replayer machine unit, such a thread could be indefinitely stalled when the replayer machine unit has no chunk for the thread, thereby delaying its forward progress indefinitely.

In an embodiment, free-mode 138 allows the deterministic execution of the replayer machine unit to be violated at any point in the replayed execution. Even though this may allow non-deterministic replayed execution, in which the replayed execution may deviate from the recorded execution, there are scenarios when a replayed execution is only desired to be deterministic up to a certain point in its re-execution. Free-mode 138 is advantageous in at least these scenarios for execution to then be controlled by additional software or hardware tools, such as data race detection, to re-create concurrency violations.

In an example, when using a concurrent predicate (CP) tool to run on top of the replay module, once a CP condition of one thread has been satisfied, the CP tool could enable free-mode 138 in the replay module to attempt to reproduce a concurrency violation. If free-mode 138 is not supported, the CP tool would be unable to stall a thread from making forward progress, if the replay module requires deterministic execution. This could result in a limited view of all possible concurrency violations.

One or more embodiments of this disclosure recognize that non-deterministic executions can lead to concurrency violations. Different embodiments of this disclosure recognize and take into account a hardware-assisted memory race recorder (MRR). MRRs track the order in which shared-memory is accessed within a program, which is needed to reproduce the execution of that program exactly. Point-to-point MRR approaches track each individual shared-memory access by modifying the data-cache structure of a micro-processor and changing cache coherence messages payload. Such methods incur substantial spatial overhead (cache modification), making them impractical to implement in hardware, and substantial temporal overhead (cache coherence messages modification), making them impractical for "always-on" functionality, where the MRR is always actively recording program execution.

One or more embodiments of this disclosure recognize and take into account an alternative to point-to-point-based MRRs, where shared-memory accesses are captured using Bloom filters and global timestamps. Bloom filters reduce the logging spatial overhead incurred by point-to-point-based MRRs because they are a fixed size. Global timestamps avoid modifying coherence messages. Chunk-based MRRs use chunks, where a chunk represents the sequence of memory operations that have been executed without a conflicting cache coherence message.

Unlike point-to-point-based MRRs, chunk-based MRRs may only incur logging overhead when one thread accesses memory that exists in another thread's chunk. When such an event occurs, the chunk that contains the shared-memory access is terminated and an abbreviated form of its memory accesses is logged. Chunk-based MRRs are practically implementable within hardware because of their small hardware footprint, and, due to their reduced logging computational overhead, are capable of "always-on" recording.

One or more embodiments of this disclosure provide how to implement the deterministic replay of an execution recorded by a chunk-based MRR; a specific replay module optimization that yields O(1) search-time, an improvement over other replay module designs that incur O(N) search-time, where "N" is the number of total recorded chunks for all threads; details for handling corner cases of deterministic executions, such as thread construction and free-mode, which enable the replay module to be extended such that it can handle important problems that are likely to be layered on top of the replay module, such as debugging the execution that is being replayed.

One or more embodiments of this disclosure recognize and take into account some MRRs use point-to-point replay modules which replay a recorded execution of a program by tracking and controlling each shared-memory access that is made by each thread. Such approaches can introduce impractical spatial and temporal overhead, reducing the replayed execution time by several orders of magnitude (>100x) compared to a normal execution of the program being replayed. This can make some point-to-point approaches less efficient for commercial use.

Instead of using a point-to-point replay system, one or more embodiments of this disclosure provide the design and high-level components sufficient for an MRR chunk-based replay module. An embodiment provides a practical design of a chunk-based replayer machine unit. An embodiment may introduce implementation details to handle correctness criteria that ensure the replayed execution is correct and checked dynamically with minimal run-time overhead. An embodiment may also include a specific replay module optimization that results in an O(1) search-time chunk lookup operation for instruction execution, which is an improvement over chunk-based replay module designs that incur O(N) search-time, where "N" is the number of total recorded chunks for all threads. Furthermore, an embodiment may provide the corner cases (thread construction and free-mode) that are sufficient to replay a chunk-based recorded program and may be necessary for replayer machine units to be extended with dynamic instrumentation tools.

FIG. 2 is an example illustration of a recorded log database 200 in accordance with an embodiment. Recorded log database 200 may be one example of recorded log database 114 as shown in FIG. 1. Recorded log database 200 may be a storage device. Recorded log database 200 may include recorded log files 202-206. Additionally, each recorded log file may include chunks of instructions. For example, recorded log file 202 many include chunks 1, 12, and 36, recorded log file 204 may include chunks 2-4 and 35, and recorded log file 206 many include chunks 5-11 and 13-34. Recorded log files 202-206 may each correspond to a different thread.

In an example embodiment, chunk 1 may be the first chunk. Chunk 1 may include one or more instructions. After chunk 1 is terminated, chunk 2 is created. Chunk 2 may be located in a different thread from chunk 1 and therefore, in a different recorded log file, for example, recorded log file 204. After chunk 2 is terminated chunk 3 may be created. Chunk 3 may also be located in recorded log file 204. The process of chunk creation and recording is repeated until there are no more instructions that would cause a chunk to be created.

In operational terms, and specifically in one embodiment, MRR recorded log files contain the recorded chunks from each thread. The log files are also used to capture the order in which shared-memory interleavings occurred between threads in the recorded execution multithreaded program.

FIG. 3 is a simplified flowchart illustrating a method for memory race recorder replaying in accordance with an embodiment. A flow 300 may begin at 302, when the replay module retrieves recorded log files. The recorded log files may be, for example, similar to recorded log files 202-206 as shown in FIG. 2. The recorded log files may be from a recorder unit used with a program.

At 304, the replay module puts the recorded log files in order. The replay module may use a timestamp for chunks within the recorded log files to determine an order. The timestamp ordering system of the replay module sorts the chunks across all threads in increasing timestamp order. At 306, the replay module may provide the ordered chunks for execution of the replay. The replay module may store the ordered chunks internally to control the forward execution of each thread.

At 308, the virtual machine unit may initiate a replay of the program. The replayer machine unit may use a virtualization machine unit to intercept instructions before they are executed. At 310, the replay module replays the program. At 312, the verification module verifies correctness of the replay.

In operational terms, and specifically, in an embodiment, the replay module may have an input parsing system that reads in and parses the recorded log files that contain the recorded chunks across all threads. The timestamp ordering system of the replay module may sort the chunks across all threads in increasing timestamp order. The replay module may then store that order internally to control the forward execution of each thread. The replay module uses the virtual machine unit to intercept each instruction before its execution by the replayed program. The replay module starts the execution of the recorded program.

Upon receiving notification of a pending instruction, the replay module verifies that the current instruction is part of the active chunk, that is, the chunk that is supposed to be executing based on the chunks' ordering. If the current instruction is part of the active chunk, then the replay module lets the instruction execute. If the current instruction is not part of the active chunk, the replay module halts the thread and puts it into a staller loop. The replay module may continually determine whether it is the current instruction's turn to resume execution.

Upon receiving the first instruction of a new thread, the replay module may create a mapping between the new replay thread identification and the original thread identification so the replay module can recognize which thread is active. This can be handled by referencing the chunks, which are time-ordered, to identify which thread from the recorded log files maps to a newly constructed thread in the replay module. Once the thread mapping has been created, the replay module may bind the addresses of the threads together and store them for later reference. These techniques allow the replay module to determine which thread is executing, using a mapping from the new replay thread identification to the original thread identification, if such a thread is the thread of the active chunk.

FIG. 4 is a simplified flowchart illustrating a method for replaying a program in accordance with an embodiment. A flow 400 may be a process that operates during the replay of a program. For example, flow 400 may be a more detailed illustration of the activities performed during block 310 as shown in FIG. 3.

The flow 400 may begin at 402, when a source program binary loads the instructions of the recorded program. The source program binary may be operating in a system that can allow or disallow the forward progress of individual threads of the replayed execution of the recorded program. At 404, a virtual machine unit may intercept an instruction before execution of the replayed program. Virtual machine unit 120 may be an example of the system that can allow or disallow the forward progress of the individual threads. At 406, a replay module performs a replay process.

Figure 5:
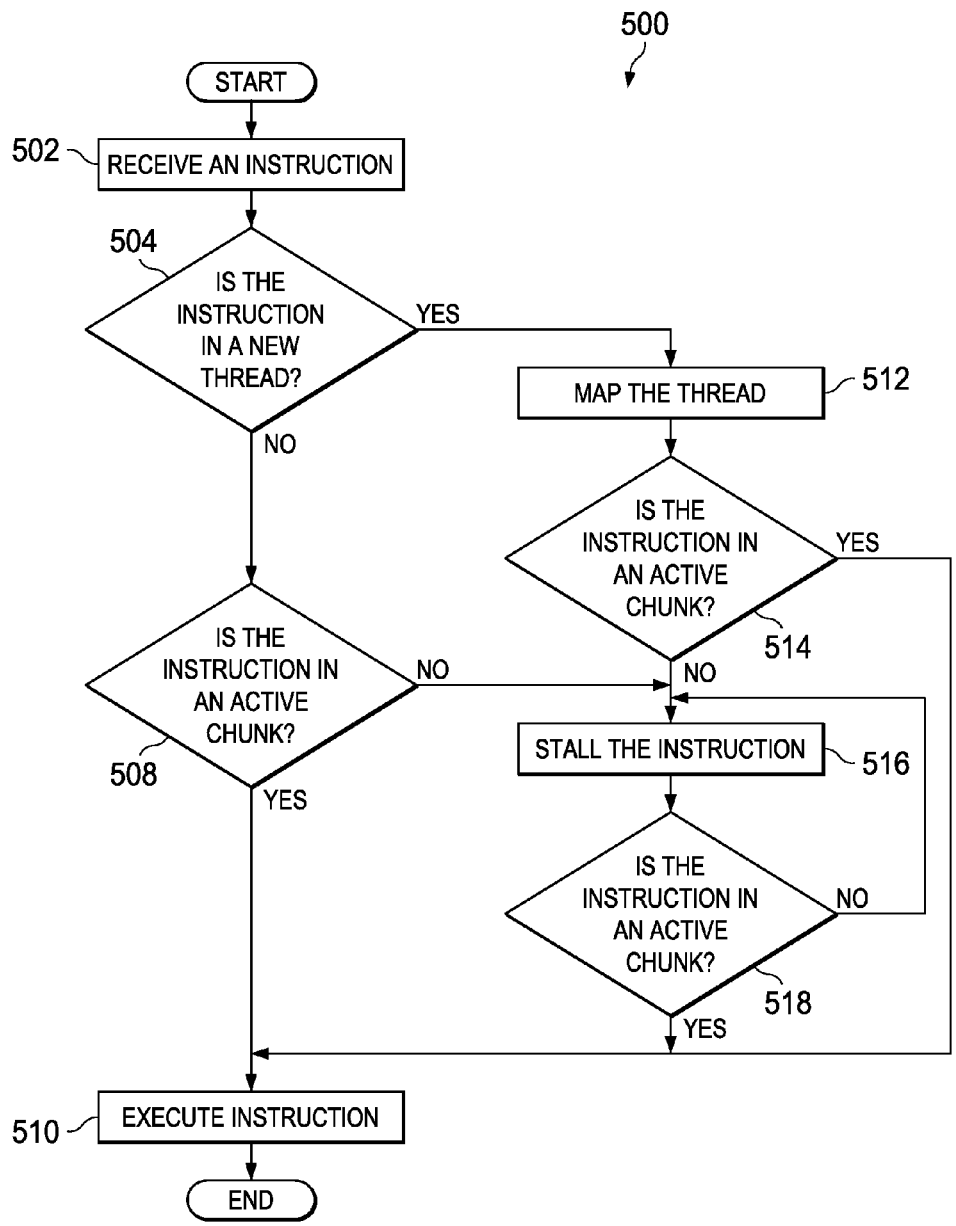
FIG. 5 is a simplified flowchart illustrating a method for a replay process in accordance with an embodiment.

FIG. 5 is a simplified flowchart illustrating a method for a replay process in accordance with an embodiment. A flow 500 may be a process that operates during a replay process. For example, flow 500 may be a more detailed illustration of the activities performed during block 406 as shown in FIG. 4.

At 502, the replay module may receive an instruction from the virtual machine unit. At 504, the replay module determines whether the instruction is in a new thread. If the instruction is not in a new thread, at 508, the replay module determines whether the instruction is in an active chunk. If the instruction is in an active chunk, at 510, the replay module executes the instruction. At 504, if the instruction is a new thread, the replay module maps the thread. The replay module may map a new replay thread ID to an original thread ID.

At 514, the replay module determines whether the instruction is in an active chunk. If the instruction is in an active chunk, at 510, the replay module executes the instruction. If the instruction is not in an active chunk, at 516, the replay module stalls the instruction until the chunk is active. Periodically, at 518, the replay module will determine whether the instruction is in an active chunk. If the instruction is not in an active chunk, at 516, the instruction continues to be stalled. If the instruction is in an active chunk, at 510, the replay module executes the instruction. Additionally, at 508, if the instruction is not in an active chunk, the replay module stalls the instruction at 516 until the chunk becomes active as determined at 518.

In operational terms, and specifically an embodiment, upon receiving notification of a pending instruction, the replay module verifies that the current instruction is part of the active chunk, that is, the chunk that is supposed to be executing based on the chunks' ordering. If the instruction is part of an active chunk, the replay module lets the instruction execute. If it is not, the replay module halts the thread and puts it into a staller loop where it continually determines whether it is the current instruction's turn to resume execution.

In an embodiment, upon receiving a first instruction of a new thread, the replay module creates a mapping from the new replay thread ID to the original recorded thread ID so the replay module knows which thread is active. This is handled by referencing the chunks that are time-ordered and recorded by the recording unit to identify which recorded thread maps to the newly constructed thread. Once the thread mapping has been identified, the replay module binds these addresses together and stores them for later reference. This allows replay module to determine which thread is executing, using the mapping from the new replay thread ID to the recorded thread ID, and if this identified thread is a thread of the active chunk.

Figure 6:
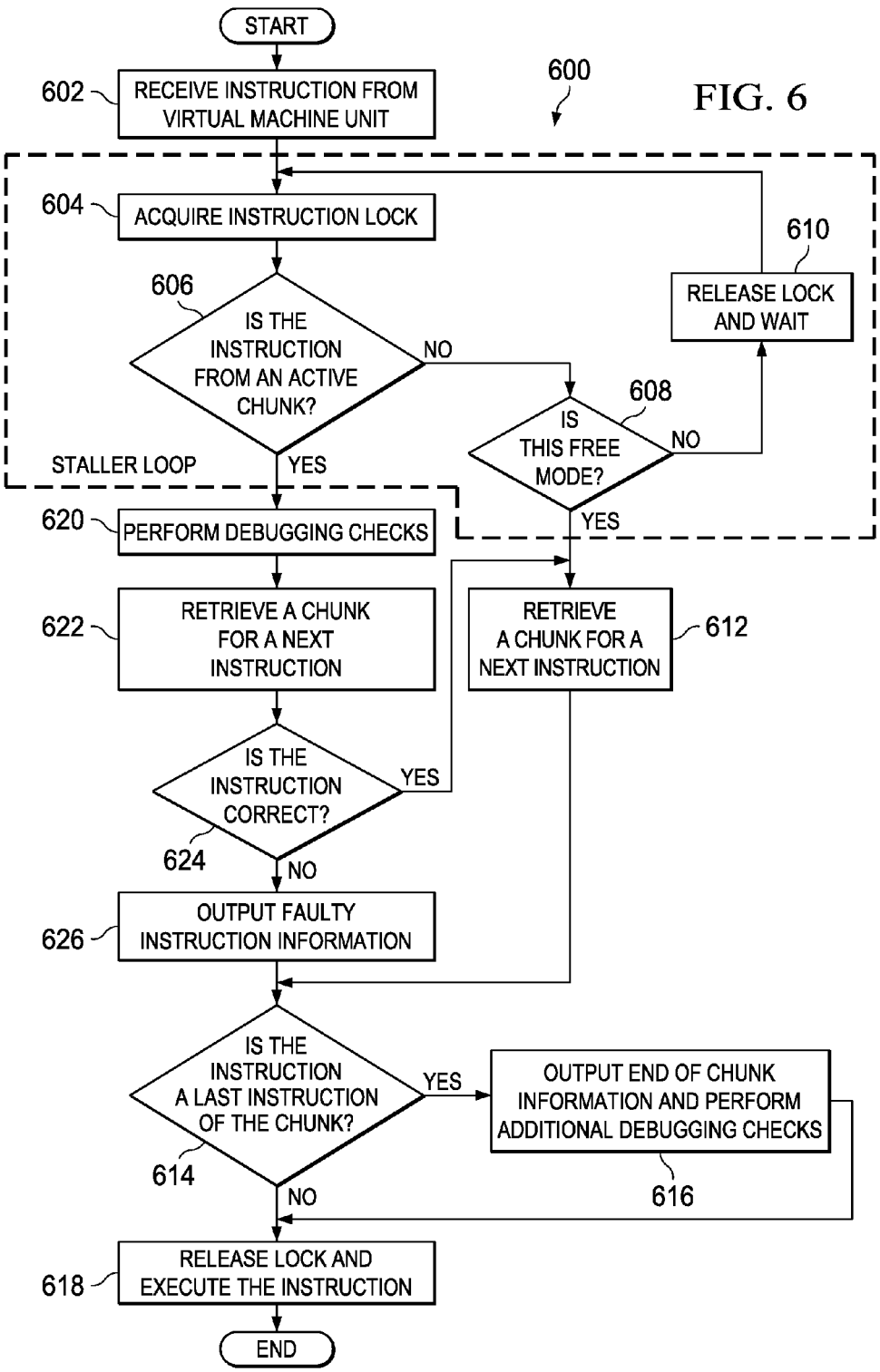
FIG. 6 is a simplified flowchart illustrating a method for a replay process in accordance with an embodiment.

FIG. 6 is a simplified flowchart illustrating a method for a replay process in accordance with an embodiment. A flow 600 may be a process that operates during a replay process. At 602, a replay module may receive an instruction from a virtual machine unit. At 604, the replay module acquires an instruction lock. An instruction lock can ensure that the replay module executes one instruction at a time. If another instruction arrives for another thread to process, it is stalled until the first thread releases the instruction lock.

At 606, the replay module determines whether the instruction is from an active chunk. If the instruction is not in an active chunk, at 608, replay module determines whether a thread for the instruction is operating in free-mode. If the thread is not in free-mode, at 610, the replay module releases the lock and waits for a period of time. The period of time may be a few milliseconds or any other suitable time set for the waiting period. After the waiting period expires, the replay module acquires the instruction lock again at 604. The process flow of 604-610 may be referred to as a staller loop. During this time, the instruction is prevented from executing until the chunk becomes active.

If the thread in which the instruction is executing is in free-mode, at 612, the replay module retrieves a chunk for a next instruction. At 614, the replay module determines whether the instruction is the last instruction of the chunk. The replay module may be able to identify whether the instruction is the last instruction of the chunk by identifying if the next instruction is in the same chunk. When performing a chunk process such as identifying an active chunk or retrieving a chunk for a next instruction, the replay module may begin a lookup process from the current instruction. By starting from the instruction, the process may only have an overhead of one cycle.

If the instruction is the last instruction of the chunk, at 616, the replay module outputs end of chunk information and a verification module may perform additional debugging checks. A verification module, such as verification module 136 as shown in FIG. 1, may perform the debugging checks. If the instruction is not the last instruction of the chunk, at 618, the replay module releases the instruction lock and executes the instruction. Debugging checks may also be referred to as correctness checks or correctness verification.

With reference again to 606, if the instruction is from an active chunk, at 620, the verification module may perform debugging checks. The debugging checks may include boundary checking. At 622, the replay module may retrieve a chunk for the next instruction. At 624, the verification module determines whether the instruction is correct. If the instruction is correct, at 612, the reply module retrieves the chunk for the next instruction. If the instruction is not correct, at 626, the reply module outputs faulty instruction information. Then the flow moves to 614.

In operational terms, and specifically in an embodiment, the replay module may keep a running total number of instructions that have executed thus far as a reference into which chunk should be executing. In one embodiment, the replay module might perform a chunk-lookup operation upon each new instruction, such that all chunks can be iterated through until the total number of instructions of the chunks matches the currently executing instruction. This incurs at least O(N) temporal overhead upon each iteration, where "N" is the total number of chunks for all threads and "O" is in reference to the overhead of the system.

One or more embodiments store a reference to the active chunk and its associated instruction range, so an O(1) comparison can be made against it upon each new instruction. If the new instruction is outside the range of instructions, the next chunk is fetched, set to the globally referenced active chunk, and the instruction range is shifted appropriately. This optimization reduces the overhead for each thread from O(N) to O(1). This reduction means that as the number of chunks increase, the performance of the replay module can improve at a polynomial rate over a design that does not include such an optimization.

There may be corner cases where it may not be desirable that the active chunk be changed if it is outside of the range of instructions for a lookup of a specific chunk. These cases can include when the replay module is performing diagnostic analysis on prior packets or correctness validation on the current and next packet. These corner cases may be handled using a boolean flag that when set to true will update the active chunk and when set to false will not update the active chunk. The result is that the implementation can execute using the above-described optimization with minimal added complexity.

FIG. 7 is a simplified flowchart illustrating a process for replaying an instruction in accordance with an embodiment. A flow 700 may be a process that operates during the replay of a program. At 702, a replay module initiates execution of a program. The program may include a plurality of sets of instructions. Each set of instructions may include a number of chunks of instructions. In an embodiment, the program executes in a virtual environment run by a virtual machine unit.

During execution of the program, at 704, the virtual machine unit may intercept an instruction of a chunk of the number of chunks before execution of the instruction. At 706, a replay module determines whether the chunk is an active chunk. During execution of a replay, the replay module may execute instructions in order of the chunk in which the instructions belong. The active chunk may be the chunk currently in line for execution. If the chunk is the active chunk, at 708, the replay module executes the instruction. If the chunk is not the active chunk, the replay module stalls the instruction until the chunk is active. For example, later in the execution process, when the chunk is active, the replay module can execute the instruction.

FIG. 8 is a simplified flowchart illustrating a process for mapping thread identifications in accordance with an embodiment. A flow 800 may be a process that operates during the replay of a program. At 802, a replay module determines whether the instruction is a first instruction in a thread. If the instruction is not the first instruction, flow 800 terminates. If the instruction is the first instruction, at 804, the replay module assigns a new replay thread ID to the recorded thread. At 806, the replay module maps the new replay thread ID to an original ID for the recorded thread. The original ID may be the ID that the thread had when it was originally executed in a program and recorded by a recorder unit.

FIG. 9 is a simplified flowchart illustrating a process for operating free-mode in accordance with an embodiment. A flow 900 may be a process that operates during the replay of a program. At 902, a replay module determines whether a chunk is the last chunk of a number of chunks in a thread. If the chunk is not the last chunk, flow 900 terminates. If the chunk is the last chunk, at 904, the replay module operates the thread in free-mode after execution of the last chunk.

Figure 10:
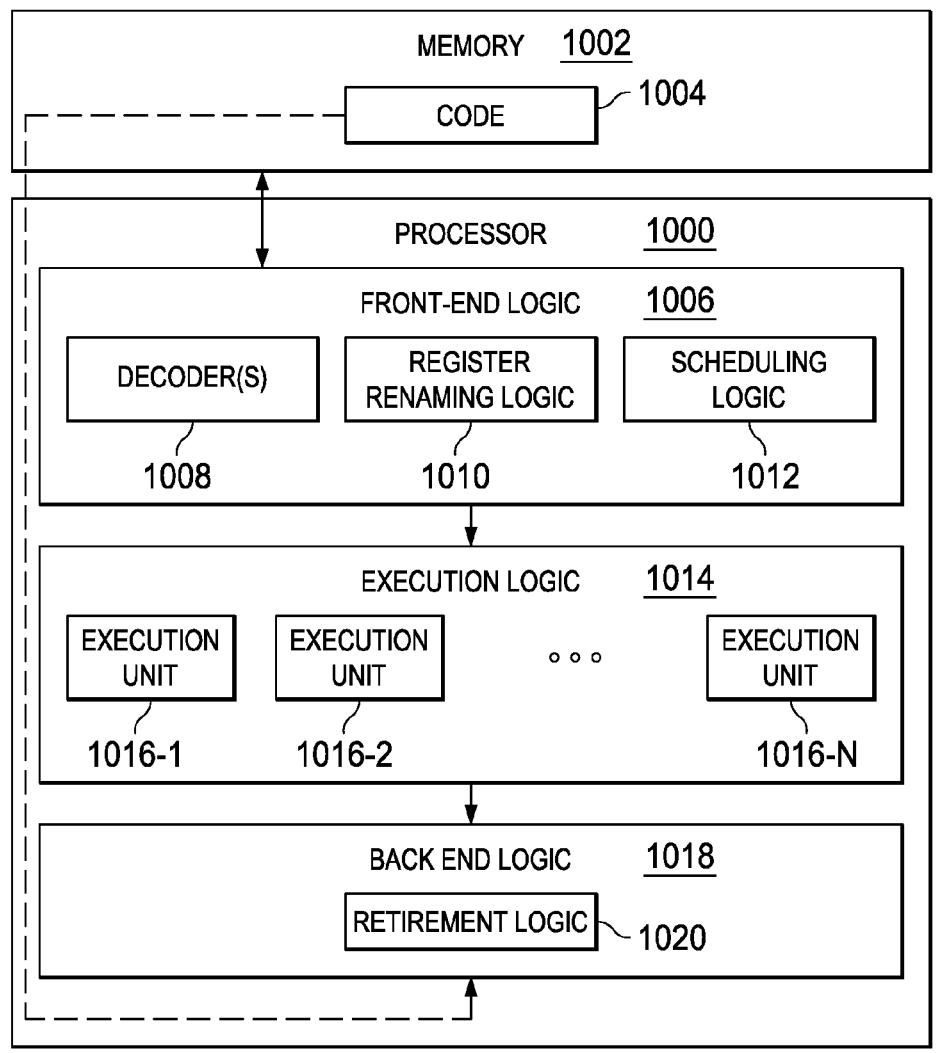
FIG. 10 is an example illustration of a processor according to one embodiment.

FIG. 10 is an example illustration of a processor according to one embodiment. Processor 1000 may be the core for any type of processor, such as a microprocessor, an embedded processor, a digital signal processor (DSP), a network processor, or other device to execute code. Although only one processor 1000 is illustrated in FIG. 10, a processing element may alternatively include more than one of processor 1000 illustrated in FIG. 10. Processor 1000 may be a single-threaded core or, for at least one embodiment, the processor 1000 may be multithreaded in that it may include more than one hardware thread context (or "logical processor") per core.

FIG. 10 also illustrates a memory 1002 coupled to processor 1000. Memory 1002 may be any of a wide variety of memories (including various layers of memory hierarchy) as are known or otherwise available to those of skill in the art. The memory 1002 may include code 1004, which may be one or more instructions, to be executed by processor 1000. Processor 1000 follows a program sequence of instructions indicated by code 1004. Each instruction enters a front-end logic 1006 and is processed by one or more decoders 1008. The decoder may generate as its output a micro operation such as a fixed width micro operation in a predefined format, or may generate other instructions, microinstructions, or control signals that reflect the original code instruction. Front-end logic 1006 also includes register renaming logic 1010 and scheduling logic 1012, which generally allocate resources and queue the operation corresponding to the convert instruction for execution.

Processor 1000 is shown including execution logic 1014 having a set of execution units 1016-1 through 1016-N. Some embodiments may include a number of execution units dedicated to specific functions or sets of functions. Other embodiments may include only one execution unit or one execution unit that can perform a particular function. Execution logic 1014 performs the operations specified by code instructions.

After completion of execution of the operations specified by the code instructions, back-end logic 1018 retires the instructions of code 1004. In one embodiment, processor 1000 allows out of order execution but requires in order retirement of instructions. Retirement logic 1020 may take a variety of forms as known to those of skill in the art (e.g., re-order buffers or the like). In this manner, processor 1000 is transformed during execution of code 1004, at least in terms of the output generated by the decoder, hardware registers and tables utilized by register renaming logic 1010, and any registers (not shown) modified by execution logic 1014.

Although not illustrated in FIG. 10, a processing element may include other elements on a chip with processor 1000. For example, a processing element may include memory control logic along with processor 1000. The processing element may include I/O control logic and/or may include I/O control logic integrated with memory control logic. The processing element may also include one or more caches.

Figure 11:
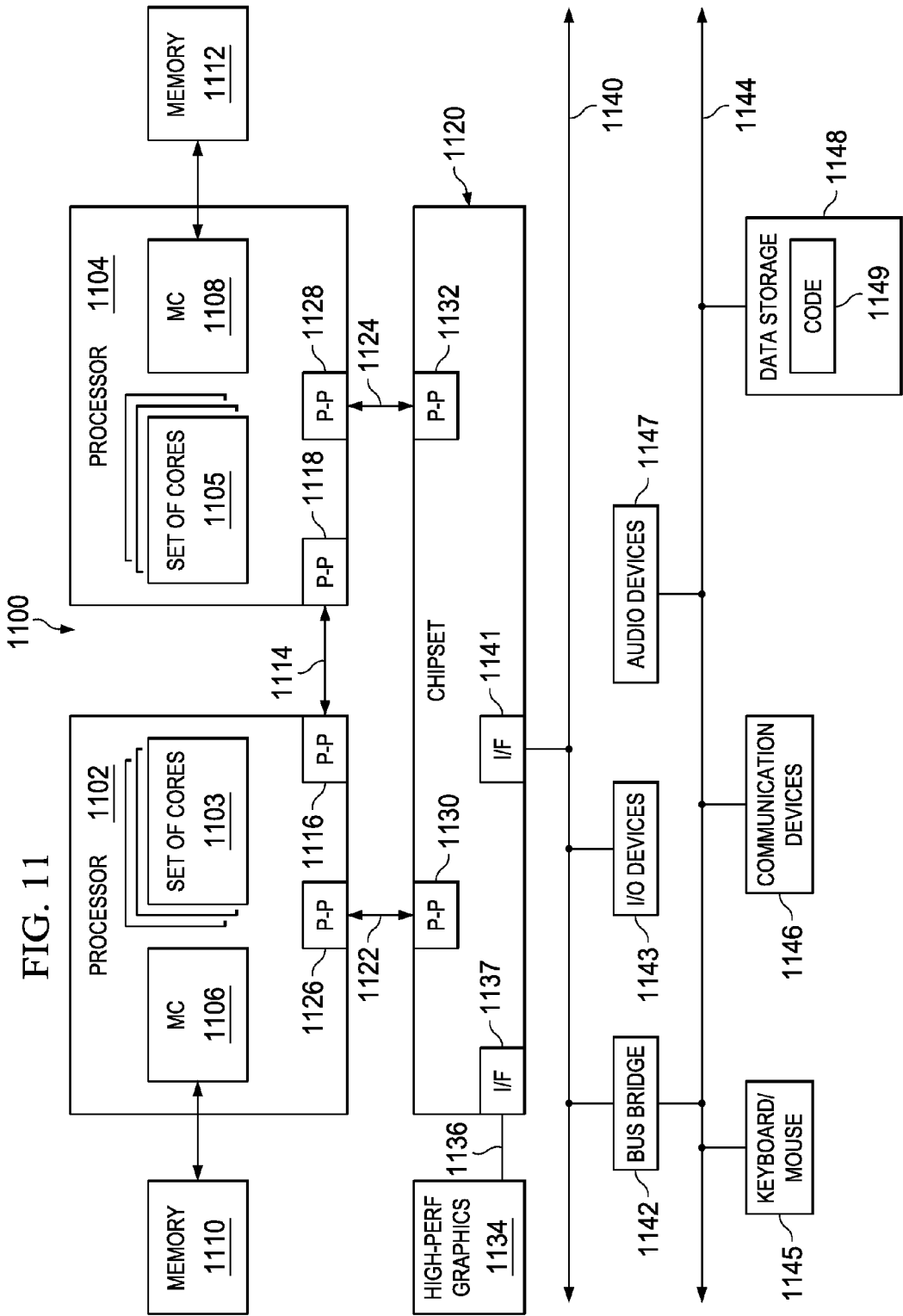
FIG. 11 illustrates a computing system that is arranged in a point-to-point configuration according to an embodiment.

FIG. 11 illustrates a computing system 1100 that is arranged in a point-to-point (PtP) configuration according to an embodiment. In particular, FIG. 11 shows a system where processors, memory, and input/output devices are interconnected by a number of point-to-point interfaces.

As illustrated in FIG. 11, system 1100 may include several processors, of which only two, processors 1102 and 1104, are shown for clarity. Processors 1102 and 1104 may each include a set of cores 1103 and 1105 to execute multiple threads of a program. Processors 1102 and 1104 may also each include integrated memory controller logic (MC) 1106 and 1108 to communicate with memories 1110 and 1112. The memories 1110 and/or 1112 may store various data such as those discussed with reference to memory 1112. In alternative embodiments, memory controller logic 1106 and 1108 may be discrete logic separate from processors 1102 and 1104.

Processors 1102 and 1104 may be any type of a processor such as those discussed with reference to processor 102 of FIG. 1. Processors 1102 and 1104 may exchange data via a point-to-point (PtP) interface 1114 using point-to-point interface circuits 1116 and 1118, respectively. Processors 1102 and 1104 may each exchange data with a chipset 1120 via individual point-to-point interfaces 1122 and 1124 using point-to-point interface circuits 1126, 1128, 1130, and 1132. Chipset 1120 may also exchange data with a high-performance graphics circuit 1134 via a high-performance graphics interface 1136, using an interface circuit 1137, which could be a PtP interface circuit. In alternative embodiments, any or all of the PtP links illustrated in FIG. 11 could be implemented as a multi-drop bus rather than a PtP link.

At least one embodiment, as disclosed herein, may be provided within the processors 1102 and 1104. Other embodiments, however, may exist in other circuits, logic units, or devices within the system 1100 of FIG. 11. Furthermore, other embodiments may be distributed throughout several circuits, logic units, or devices illustrated in FIG. 11.

Chipset 1120 may be in communication with a bus 1140 via an interface circuit 1141. Bus 1140 may have one or more devices that communicate over it, such as a bus bridge 1142 and I/O devices 1143. Via a bus 1144, bus bridge 1143 may be in communication with other devices such as a keyboard/mouse 1145 (or other input device such as a touch screen, for example), communication devices 1146 (such as modems, network interface devices, or other types of communication devices that may communicate through a computer network), audio I/O device 1147, and/or a data storage device 1148. Data storage device 1148 may store code 1149 that may be executed by processors 1102 and/or 1104. In alternative embodiments, any portions of the bus architectures could be implemented with one or more PtP links.

The computer systems depicted in FIGS. 10 and 11 are schematic illustrations of embodiments of computing systems that may be utilized to implement various embodiments discussed herein. It will be appreciated that various components of the systems depicted in FIGS. 10 and 11 may be combined in a system-on-a-chip (SoC) architecture or in any other suitable configuration. For example, embodiments disclosed herein can be incorporated into systems such as, for example, mobile devices such as smart cellular telephones, tablet computers, personal digital assistants, portable gaming devices, etc. It will be appreciated that these mobile devices may be provided with SoC architectures in at least some embodiments.

Note that in certain example implementations, the replay functions outlined herein may be implemented by logic encoded in one or more tangible media (e.g., embedded logic provided in an application specific integrated circuit (ASIC), digital signal processor (DSP) instructions, software (potentially inclusive of object code and source code) to be executed by a processor, or other similar machine, etc.). In some of these instances, a memory element can store data used for the operations described herein. This includes the memory element being able to store software, logic, code, or processor instructions that are executed to carry out the activities described in this Specification. A processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., FPGA, EPROM, EEPROM) or an ASIC that includes digital logic, software, code, electronic instructions, or any suitable combination thereof.

Program code, or instructions, may be stored in, for example, volatile and/or non-volatile memory, such as storage devices and/or an associated machine readable or machine accessible medium including, but not limited to, solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any mechanism for storing, transmitting, or receiving information in a form readable by a machine, and the medium may include a medium through which the program code may pass, such as antennas, optical fibers, communications interfaces, etc. Program code may be transmitted in the form of packets, serial data, parallel data, etc., and may be used in a compressed or encrypted format.

In one example implementation, the replayer machine unit may include software in order to achieve the replay activities outlined herein. In an example embodiment, the components of the chunk-based replayer machine unit 118 may be implemented entirely in software, alleviating the need for any specialized hardware. The replayer machine unit can include memory elements for storing information to be used in achieving the replay activities, as discussed herein. Additionally, the replayer machine unit may include a processor that can execute software or an algorithm to perform the replay activities, as disclosed in this Specification. These devices may further keep information in any suitable memory element (RAM, ROM, EPROM, EEPROM, ASIC, etc.), software, hardware, or in any other suitable component, device, element, or object where appropriate and based on particular needs. Any of the memory items discussed herein (e.g., databases, tables, trees, caches, etc.) should be construed as being encompassed within the broad term 'memory element.' Similarly, any of the potential processing elements, modules, and machines described in this Specification should be construed as being encompassed within the broad term 'processor.'

Note that with the example provided above, as well as numerous other examples provided herein, interaction might be described in terms of two, three, or four elements. However, this has been done for purposes of clarity and example only. In certain cases, it may be easier to describe one or more of the functionalities of a given set of flows by only referencing a limited number of elements. It should be appreciated that the replayer machine unit (and its teachings) is readily scalable and can accommodate a large number of components, as well as more complicated/sophisticated arrangements and configurations. Accordingly, the examples provided should not limit the scope or inhibit the broad teachings of the replayer machine unit as potentially applied to a myriad of other architectures.

Additionally, the operations in the preceding flow diagrams illustrate only some of the possible scenarios and patterns that may be executed by, or within, a replayer machine unit. Some of these operations may be deleted or removed where appropriate, or may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. A replayer machine unit provides substantial flexibility in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. While the present disclosure has described a limited number of embodiments, those skilled in the art will appreciate numerous modifications and variations therefrom. The appended claims are intended to cover all such modifications and variations as fall within the true spirit and scope of the present disclosure.

The following examples pertain to embodiments in accordance with this Specification. One or more embodiments may provide a method for performing a replay. The method may include: initiating execution of a program, the program having a plurality of sets of instructions, each set of instructions having a number of chunks of instructions; intercepting, by a virtual machine unit executing on a processor, an instruction of a chunk of the number of chunks before execution; determining, by a replay module executing on the processor, whether the chunk is an active chunk; and responsive to the chunk being the active chunk, executing the instruction.

An example of one or more embodiments may provide that the active chunk of the plurality of chunks is currently being executed by the replay module.

An example of one or more embodiments may provide that each set of instructions corresponds to a thread.

An example of one or more embodiments may provide: determining whether the instruction is a first instruction in the thread; responsive to the instruction being the first instruction, assigning a new thread identification to the thread; and mapping the new thread identification to an original identification for the thread.

An example of one or more embodiments may further provide: responsive to the chunk not being the active chunk, stalling the instruction until the chunk is the active chunk.

An example of one or more embodiments may further provide: identifying whether the chunk is a last chunk of the number of chunks; and operating the thread in free-mode after execution of the chunk if the chunk is the last chunk.

An example of one or more embodiments may further provide: determining whether the execution matches a recorded execution.

One or more embodiments may provide an apparatus. The apparatus may include: a virtual machine unit executing on a processor, the virtual machine unit configured to intercept an instruction of a chunk of a number of chunks before execution; and a replay module executing on the processor, the replay module configured to: initiate execution of a program, the program having a plurality of sets of instructions, each set of instructions having the number of chunks of instructions; determine whether the chunk is an active chunk; and responsive to the chunk being the active chunk, execute the instruction.

An example of one or more embodiments may provide that the active chunk of the plurality of chunks is currently being executed by the replay module.

An example of one or more embodiments may provide that each set of instructions corresponds to a thread.

An example of one or more embodiments may further provide the replay module being configured to: determine whether the instruction is a first instruction in the thread; responsive to the instruction being the first instruction, assign a new thread identification to the thread; and map the new thread identification to an original identification for the thread.

An example of one or more embodiments may further provide the replay module being configured to: responsive to the chunk not being the active chunk, stall the instruction until the chunk is the active chunk.

An example of one or more embodiments may further provide the replay module being configured to: identify whether the chunk is a last chunk of the number of chunks; and operate the thread in free-mode after execution of the chunk if the chunk is the last chunk.

An example of one or more embodiments may further provide: a verification module executing on the processor, the verification module configured to determine whether the execution matches a recorded execution.

One or more embodiments may provide at least one non-transitory machine accessible storage medium having instructions stored thereon. The instructions when executed on a machine, cause the machine to: initiate execution of a program, the program having a plurality of sets of instructions, each set of instructions having a number of chunks of instructions; intercept an instruction of a chunk of the number of chunks before execution; determine whether the chunk is an active chunk; and responsive to the chunk being the active chunk, execute the instruction.

An example of one or more embodiments may provide that each set of instructions corresponds to a thread.

An example of one or more embodiments may provide further instructions that when executed on the machine, cause the machine to: determine whether the instruction is a first instruction in the thread; responsive to the instruction being the first instruction, assign a new thread identification to the thread; and map the new thread identification to an original identification for the thread.

An example of one or more embodiments may provide instructions that when executed on the machine, cause the machine to: responsive to the chunk not being the active chunk, stall the instruction until the chunk is the active chunk.

An example of one or more embodiments may provide further instructions that when executed on the machine, cause the machine to: identify whether the chunk is a last chunk of the number of chunks; and operate the thread in free-mode after execution of the chunk if the chunk is the last chunk.

An example of one or more embodiments may provide further instructions that when executed on the machine, cause the machine to: determine whether the execution matches a recorded execution.

What is claimed is:

1. A method for performing a replay of a previous execution of a program, the method comprising:
   generating an order of recorded chunks of instructions across a plurality of recorded threads based, at least in part, on log files generated from the previous execution of the program;
   initiating an execution of the program, the executing program having a plurality of threads, each thread having a number of chunks of instructions;
   intercepting, by a virtual machine unit executing on a processor, an instruction of a chunk before the instruction is executed;
   determining, by a replay module executing on the processor, that the chunk is an active chunk if the chunk is currently in line for execution according to the order of recorded chunks; and
   responsive to a determination that the chunk is the active chunk, executing the instruction.

2. The method of claim 1, further comprising:
   determining whether the instruction is a first instruction in the thread;
   responsive to the instruction being the first instruction, assigning a new thread identification to the thread; and
   mapping the new thread identification to an original identification for the thread.

3. The method of claim 1, further comprising:
   responsive to a determination that the chunk is not the active chunk, stalling the instruction until the chunk is the active chunk.

4. The method of claim 1, further comprising:
   identifying whether the chunk is a last chunk in the thread; and
   operating the thread in free-mode after execution of the chunk if the chunk is the last chunk.

5. The method of claim 1, further comprising:
   determining whether the execution matches a recorded execution, wherein the recorded execution is based on the previous execution of the program.

6. An apparatus, comprising:
   a recorder unit, when executed on a processor, is to generate an order of recorded chunks of instructions across a plurality of recorded threads based, at least in part, on log files generated from a previous execution of the program;
a virtual machine unit, when executed on the processor, is to intercept an instruction of a chunk of instructions before the instruction is executed; and
a replay module, when executed on the processor, is to:
initiate an execution of the program that was previously executed, the executing program to have a plurality of threads, and each thread to have a number of chunks of instructions;
determine that the chunk is an active chunk if the chunk is currently in line for execution according to the order of recorded chunks; and
responsive to a determination that the chunk is the active chunk, execute the instruction.

7. The apparatus of claim 6, wherein the replay module, when executed by the processor, is to:
determine whether the instruction is a first instruction in the thread;
responsive to the instruction being the first instruction, assign a new thread identification to the thread; and
map the new thread identification to an original identification for the thread.

8. The apparatus of claim 6, wherein the replay module, when executed by the processor, is to:
responsive to a determination that the chunk is not the active chunk, stall the instruction until the chunk is the active chunk.

9. The apparatus of claim 6, wherein the replay module, when executed by the processor, is to:
identify whether the chunk is a last chunk in the thread; and
operate the thread in free-mode after execution of the chunk if the chunk is the last chunk.

10. The apparatus of claim 6, further comprising:
a verification module, when executed by the processor, is to:
determine whether the execution matches a recorded execution, wherein the recorded execution is based on the previous execution of the program.

11. At least one non-transitory machine accessible storage medium comprising code stored thereon, the code when executed on a machine, causes the machine to:
generate an order of recorded chunks of instructions across a plurality of recorded threads based, at least in part, on log files generated from a previous execution of a program;
initiate an execution of the program that was previously executed, the executing program to have a plurality of threads, each thread to have a number of chunks of instructions;
intercept an instruction of a chunk before the instruction is executed;
determine that the chunk is an active chunk if the chunk is currently in line for execution according to the order of recorded chunks; and
responsive to a determination that the chunk is the active chunk, execute the instruction.

12. The non-transitory machine accessible storage medium of claim 11, wherein the code, when executed on the machine, causes the machine to:
determine whether the instruction is a first instruction in the thread;
responsive to the instruction being the first instruction, assign a new thread identification to the thread; and
map the new thread identification to an original identification for the thread.

13. The non-transitory machine accessible storage medium of claim 11, wherein the code, when executed on the machine, causes the machine to:
responsive to a determination that the chunk is not the active chunk, stall the instruction until the chunk is the active chunk.

14. The non-transitory machine accessible storage medium of claim 11, wherein the code, when executed on the machine, causes the machine to:
identify whether the chunk is a last chunk in the thread; and
operate the thread in free-mode after execution of the chunk if the chunk is the last chunk.

15. The non-transitory machine accessible storage medium of claim 11, wherein the code, when executed on the machine, causes the machine to:
determine whether the execution matches a recorded execution, wherein the recorded execution is based on the previous execution of the program.

* * * * *